July 17, 1928.

H. D. PAYNE 1,677,291

WASHING MACHINE DRIVE

Filed Nov. 26, 1924

WITNESSES:
R. S. Harrison
E. W. Savage

INVENTOR
Halsey D. Payne
BY
Wesley G. Carr
ATTORNEY

July 17, 1928.  
H. D. PAYNE  
1,677,291  
WASHING MACHINE DRIVE  
Filed Nov. 26, 1924  2 Sheets-Sheet 2

WITNESSES:
R. S. Harrison
E. W. Savage

INVENTOR
Halsey D. Payne
BY
Wesley G. Carr
ATTORNEY

Patented July 17, 1928.

1,677,291

UNITED STATES PATENT OFFICE.

HALSEY D. PAYNE, OF CHICAGO, ILLINOIS, ASSIGNOR TO WESTINGHOUSE ELECTRIC & MANUFACTURING COMPANY, A CORPORATION OF PENNSYLVANIA.

WASHING-MACHINE DRIVE.

Application filed November 26, 1924. Serial No. 752,332.

This invention relates to clutches and more particularly to clutches applicable to washing-machine drives.

The object of the invention, generally stated, is the provision of a clutch that shall be simple and efficient in operation and readily and economically manufactured.

A more specific object of the invention is to provide for the connecting and disconnecting of a driving member and a driven member and the locking of the driven member in a predetermined position when the members are disconnected.

Another object of the invention is to provide for the actuation of the locking means as the clutch is operated.

Other objects of the invention will, in part, be obvious and in part appear hereinafter.

The invention accordingly is disclosed in the embodiment thereof shown in the accompanying drawing and comprises the features of construction, combination of elements and arrangement of parts that will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Figure 1:
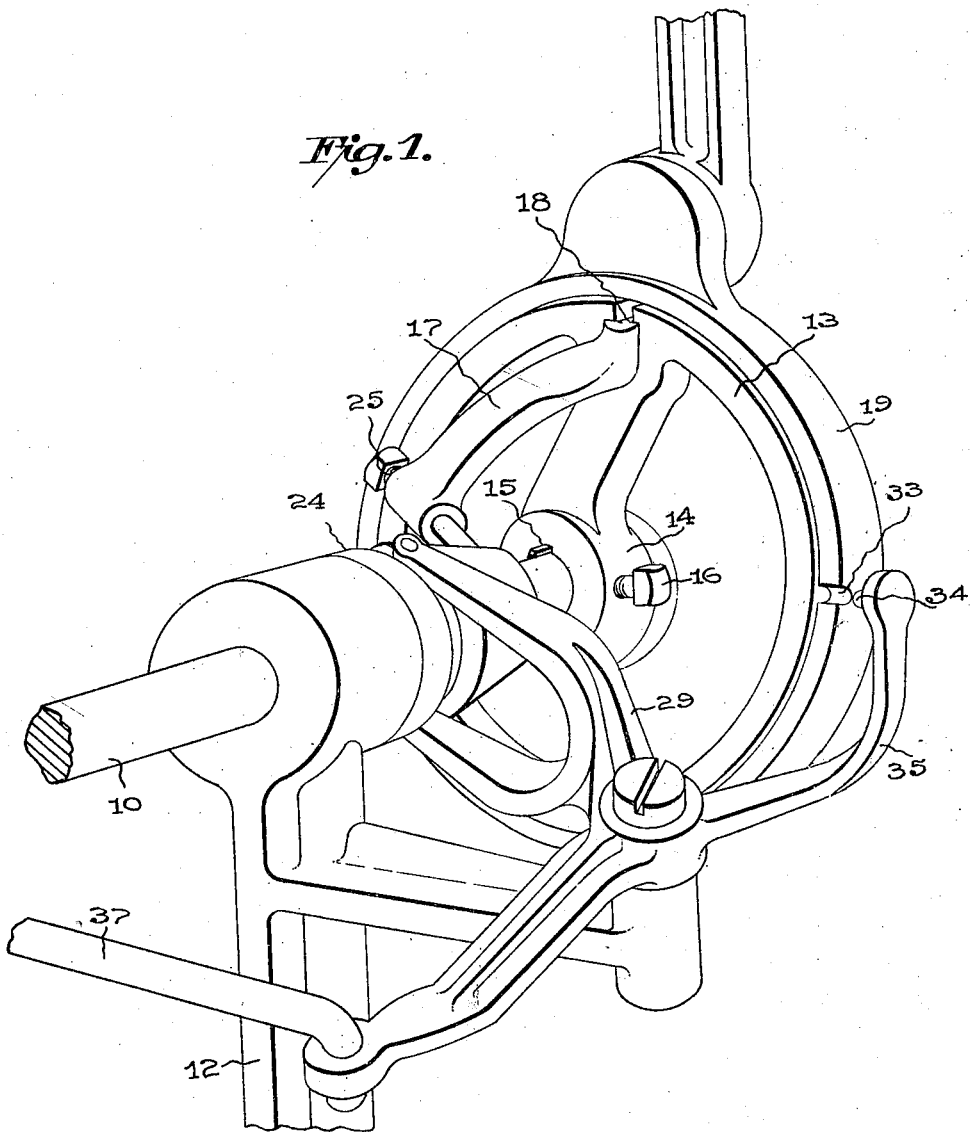
Figure 1 is a perspective view of a clutch constructed in accordance with this invention.

Referring now to the drawing, 10 designates generally a drive shaft rotatably mounted in a bearing carried by the frame 12 and connected to any prime mover, such as the motor 11. Hereinafter, the shaft 10 will be referred to as the driving member.

As will be observed, a resilient split ring 13, carried by a hub member 14, constitutes one of the clutch members. The hub 14 is adapted to receive the end of the driving member 10 and may be attached thereto by any suitable means, such, for example as a key 15 and a set screw 16, as shown in Fig. 1.

Rotatably mounted on the clutch member B, is a band 19 which constitutes the other clutch member. In order to provide for the engagement of the complementary clutch members, they are provided with friction faces disposed adjacent to one another. It will be readily understood that the gripping action of the clutch members may be varied by changing the coefficient of friction or the size of the friction faces.

With a view to providing for the expansion of the clutch member 13 to engage the band 19, a spreader 18 is rotatably disposed between its ends. In order to support the spreader 18 in position, a cylindrical projection 21 is provided on its inner end and extended into a pocket 20 cut in the inner face of the clutch member 13. As shown, a washer 22, which sets on the inner wall of the pocket, is mounted on the projection 21 and retained in position by a cotter pin 23.

The spreader may be of any suitable construction and, in this embodiment of the invention, consists of a block substantially elliptical in cross section mounted in the manner described to extend parallel to the axis of the split ring.

Figure 4:
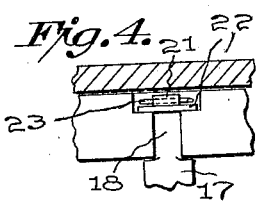
Fig. 4 is a top plan view of the structure shown in Fig. 3.
Figure 3:
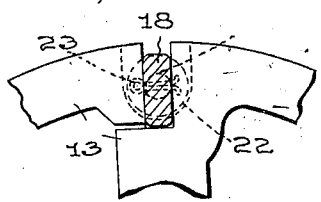
Fig. 3 is a fragmentary view of the upper portion of one of the clutch members, showing an actuating member in position.

A lever arm 17, carried by the spreader 18, is disposed to ride on a sleeve 24 which is rotatably and slidably mounted on the driving member 10. As will be noted, the sleeve 24 is shaped to simulate a conic frustum so that, as it is moved longitudinally of the shaft, it cooperates with the resilient split ring to oscillate the lever arm 17 about the axis of the spreader 18, to operate the latter. Further, as shown in Figs. 1 and 4, the lever arm, at its point of juncture with the spreader, is provided with shoulders shaped to seat on the side of the split ring, to prevent any swinging movement of the spreader as it is operated.

Figure 5:
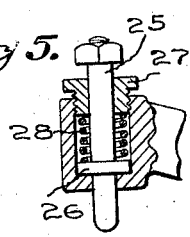
Fig. 5 is a detail view of one of the links provided for actuating the clutch.

Efficiency in operation and assemblage may be effected by providing resilient, adjustable clutch-actuating members. Accordingly, as shown in Fig. 5, a pin 25 having a collar 26 is slidably mounted in a socket provided in the end of the lever arm 17. A threaded cap 27, having an opening through which the upper end of the pin extends, is adjustably mounted in an internal thread provided in the socket and serves to retain the pin in position.

As will be observed, the lower end of the pin extends through an opening in the lever arm and engages the sleeve 24. A spring 28 is interposed between the cap 27 and the collar 26 for retaining the pin in engagement with the sleeve and providing for a resilient action of the actuating members.

In order to provide for the movement of the sleeve 24 longitudinally of the shaft 10 to operate the lever arm 17, a bell crank 29 is pivotally mounted on the frame 12. As will be noted, one arm of the bell crank is bifurcated so that it may be projected over the sleeve 24. Inwardly extending pins are provided in the ends of the arms of the bifurcated portion and they engage in a circumferential groove provided in the sleeve 24.

Figure 2:
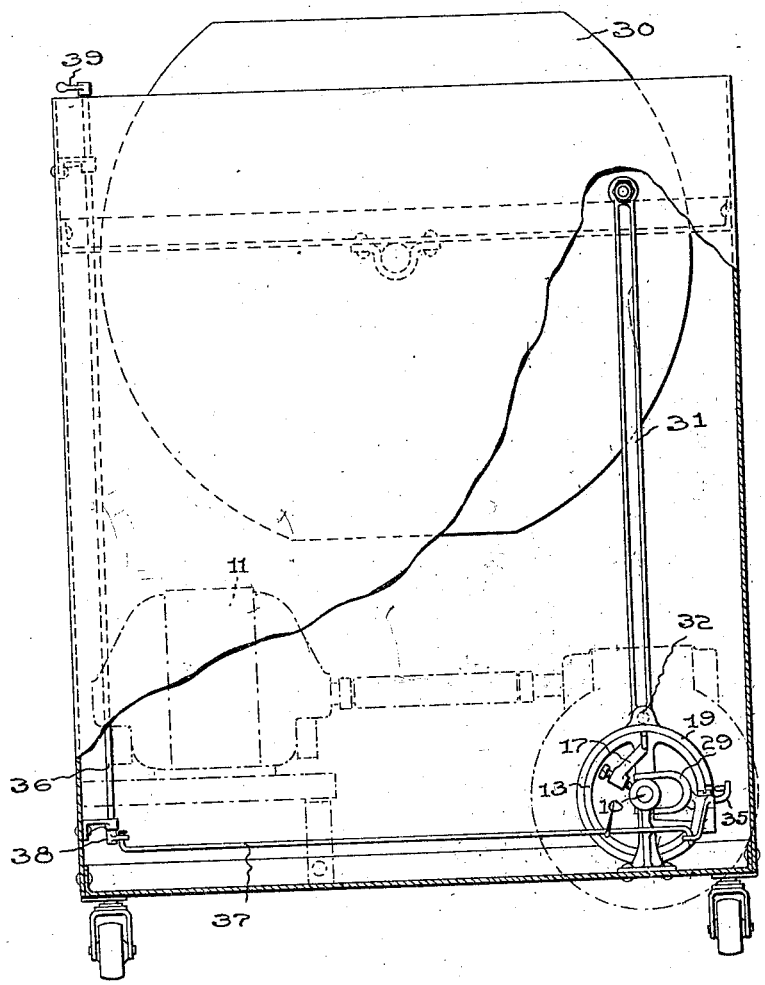
Fig. 2 is a side elevation of a washing machine, parts being broken away to show the clutch applied to a washing-machine drive.

When the clutch is applied to a washing machine drive, the band 19 is connected to a tub by means of a crank pin 32 and rod 31. If the tub 30 is disposed for oscillation about a horizontal axis, as shown in Fig. 2, it is desirable to provide some means for stopping it and locking it in a vertical position.

The locking of the tub in a vertical position may be accomplished in a number of ways. In this particular construction, an opening 33 is provided in the band 19 to receive a projection 34 formed on a pivoted arm 35. It will be readily understood that the opening 33 and the pivoted arm 35 may be disposed to stop the tub in any predetermined position. As shown, the arm 35 is carried by the bell crank 29, thereby providing for the locking of the tub in a predetermined position when the sleeve 24 is actuated to release the band 19.

Many different attachments may be provided for operating the bell crank 29 to actuate the clutch. In this particular embodiment of the invention, a rod 36 is rotatably mounted in a vertical position in the frame 12 and has attached to its lower end a crank arm 38 which is connected to the bell crank 29 by means of a connecting rod 37. The rotation of the rod 36 may be effected in any suitable manner such, for example, as by the provision of a lever 39.

Assuming that the clutch member 13 has been expanded to engage the complementary clutch member 19 and that the projection 34 has been withdrawn from the opening 33, then, when the motor 11 is set in operation, motion is transmitted to the tub 30.

In order to release the clutch member 19, the bell crank 29 is oscillated counter clockwise, as shown in Fig. 1, moving the sleeve 24 outwardly along the shaft 10 and allowing the lever arm 17 to swing downward under the action of the resilient split ring 13 on the spreader 18. Thus, the split ring disengages and releases the clutch member 19. As the bell crank 29 is oscillated counter clock wise about is pivot point, the arm 35 is also oscillated counter clock wise to move the projection 34 against the band 19. When the opening 33 alines with the projection 34, the latter engages the opening and locks the band 19 in position. The operation of the bell crank 29 is effected through the rod 36, lever 38 and connecting rod 37.

When it is desired to actuate the clutch to connect the driving and driven members, the bell crank 29 is oscillated clock wise to project the sleeve 24 inwardly by thus forcing the lower end of the lever arm 17 outwardly and rotating the spreader 18 to expand the clutch member 13 to grip the complementary clutch member 19. As the bell crank is rotated clockwise, the projection 34 is withdrawn from the opening 33 to release the clutch member 19.

While the illustrated example constitutes the particular improvement of my invention, I do not limit myself strictly to the exact details herein illustrated, since, manifestly, the same may be considerably varied without departing from the spirit of the invention, as set forth in the appended claims.

Having described my invention, what I claim as new and desire to secure by Letters Patent is:

1. A clutch for connecting a driving member to a driven member comprising, in combination, a band connected to one of said members, a split ring disposed in the band, means operable to expand the split ring to grip the band and means disposed to engage the band to retain it in a predetermined position.

2. A clutch for connecting a driving member to a driven member comprising, in combination, a band connected to one of said members, a split ring disposed in the band, means operable to expand the split ring to grip the band and a pivotally mounted arm adapted to be moved into engagement with the band to lock it in a predetermined position.

3. A clutch for connecting a driving member to a driven member comprising, in combination, a band connected to one of said members, a split ring disposed in the band, means operable to expand the split ring to grip the band, a pivotally mounted arm adapted to be moved into engagement with the band to lock it in a predetermined position, said arm having a projection formed thereon and said band having an opening formed therein to receive the projection.

4. A clutch member for connecting a driving member to a driven member comprising, in combination, a band connected to one of said members, a split ring disposed in the band, a spreader arranged between the ends of the split ring, and means disposed to engage the band and lock it in a predetermined position.

5. A clutch for connecting a driving member to a driven member comprising, in combination, a band connected to one of said members, a split ring located in the band, a spreader disposed between the ends of the split ring, a lever arm carried by the spreader, means cooperative with said lever to effect the operation of the spreader to expand the ring to grip the band, and a manually operated means adapted to lock the band in a predetermined position.

6. In a washing-machine drive, a clutch for connecting a driving member to a driven member comprising, in combination, a split ring attached to the driving member, a band connected to the driven member rotatably mounted on said split ring, means cooperative to expand said split ring to grip the band, means adapted to lock said band in a predetermined position.

7. In a washing machine drive, a clutch for connecting a driving member to a driven member comprising, in combination, a split ring attached to the driving member, a band connected to the driven member rotatably mounted on said split ring, means cooperative to expand said split ring to grip the band, means adapted to lock said band in a predetermined position, said locking means being disposed to engage the band when the band is released from the split ring.

8. In a washing-machine drive, a clutch for connecting a driving member to a driven member comprising, in combination, a split ring attached to the driving member, a band presenting a friction face rotatably disposed on the split ring, a spreader rotatably mounted between the ends of the split ring, a lever carried by said spreader, means slidably mounted on the driving member cooperative to operate the lever and means disposed for operation to lock the band in a predetermined position when released by said split ring.

9. A washing-machine drive comprising, in combination, a driving member, a split ring attached to one end of said driving member, a band rotatably disposed on said split ring, said band being connected to an oscillatory tub, a spreader rotatably mounted between the ends of the split ring, means adapted to actuate the spreader to effect the gripping of the band by said split ring, said actuating means being resilient, locking means disposed to lock the band in a predetermined position to retain the tub in a vertical position, said locking means being operable by said actuating means to lock the band in a predetermined position upon its release from the said split ring.

In testimony whereof, I have hereunto subscribed my name this 11th day of November, 1924.

HALSEY D. PAYNE.